United States Patent [19]

Amblank

[11] 3,967,649

[45] July 6, 1976

[54] MIXING VALVE ASSEMBLY

[75] Inventor: Robert Amblank, Beinwil, Switzerland

[73] Assignee: Aktiengesellschaft Oederlin & Cie, Baden, Switzerland

[22] Filed: Feb. 10, 1975

[21] Appl. No.: 548,574

[30] Foreign Application Priority Data

Feb. 21, 1974 Switzerland.......................... 2405/74
Dec. 30, 1974 Switzerland........................ 17363/74

[52] U.S. Cl.......................... 137/636.3; 137/636.2; 137/625.41
[51] Int. Cl.²........................................ F16K 11/18
[58] Field of Search... 137/636.4, 637, 637.2–637.5, 137/614.16, 614.17, 625.41, 625.16, 625.17, 625.19, 636.3, 636.2

[56] References Cited
UNITED STATES PATENTS

| | | | |
|---|---|---|---|
| 2,707,486 | 5/1955 | Johns............................ | 137/625.41 |
| 2,847,031 | 8/1958 | Brown............................ | 137/637.4 |
| 3,171,441 | 3/1965 | Schonfeld ...................... | 137/637.4 |
| 3,726,318 | 4/1973 | Hyde.............................. | 137/625.41 |

FOREIGN PATENTS OR APPLICATIONS 111,093 7/1925 Switzerland.................... 137/625.41

*Primary Examiner*—Martin P. Schwadron
*Assistant Examiner*—Richard Gerard
*Attorney, Agent, or Firm*—Pennie & Edmonds

[57] ABSTRACT

A mixing valve assembly comprises a body portion having a cylindrical bore extending therethrough and a pair of entrance channels for the admission of two dissimilar fluids (e.g. hot water and cold water), each such channel communicating with the bore through an opening in the wall of the bore. A mixing control member having a cylindrical plug is mounted with said plug in the bore of the body member and rotatable therein. The mixing control member further includes a mixing chamber, two separate inlet passages discharging into the mixing chamber, and an outlet passage discharging from the mixing chamber. Each inlet passage is movable with rotation of the plug in the bore from a closed position to an open position with respect to one of the openings in the wall of the bore. A valve seat is formed at the discharge of the inlet passages, and a valve engageable with the seat is provided. By rotation of the mixing control member in the bore of the body portion, the relative proportion of dissimilar fluids that may flow to the mixing chamber through the inlet passages is regulated, and by operation of the valve the total volume of such fluids that may enter the mixing chamber is controlled.

8 Claims, 10 Drawing Figures

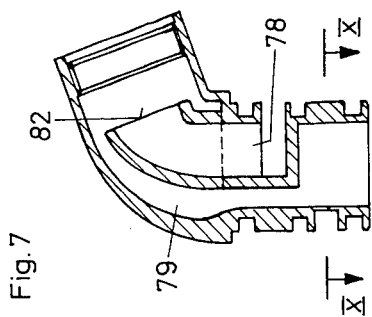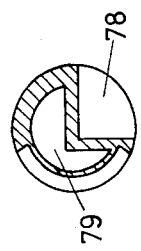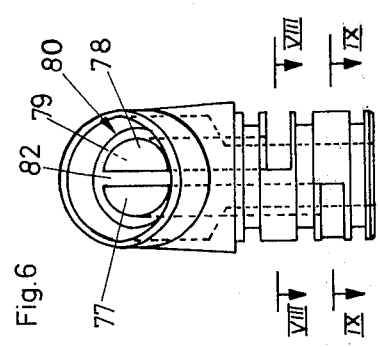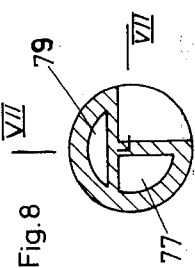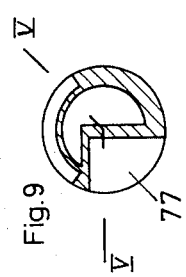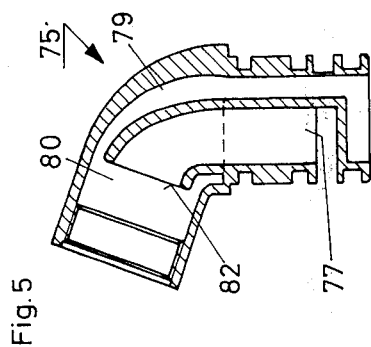

MIXING VALVE ASSEMBLY

BACKGROUND OF THE INVENTION

Heretofore known mixing valve assemblies generally provide for two dissimilar fluids, such as hot water and cold water, to flow into a mixing chamber through adjustable-size passages, and the volume of flow from the mixing chamber to a discharge spout is regulated by a valve. In such assemblies a check member, usually a sleeve of rubber or other elastomer, is provided to shut off both fluids when the volume control valve is closed; but when such check member develops a leak, fluid from one source may leak into the other fluid, e.g. hot water may leak into the cold water line or vise versa. Moreover, such sleeve checks are subject to mechanical and thermal wear, and their elasticity may be altered undesirably by being subject to high temperature differentials.

NATURE AND STATEMENT OF THE INVENTION

The present invention provides a mixing valve assembly which overcomes the foregoing shortcomings. The assembly of the invention comprises a body portion formed with a cylindrical bore extending therethrough, and a pair of entrance channels for two dissimilar fluids (such as hot water and cold water). Each such channel communicates with the bore through an opening in the wall of the bore. A mixing control member formed with a cylindrical plug is mounted and rotatable in the bore of the housing. The control member further includes a mixing chamber, two separate inlet passages extending from the plug and discharging into the mixing chamber, and an outlet passage discharging from the mixing chamber into and through a discharge spout. Each inlet passage where it extends into the plug is movable by rotation of the plug in the bore from a closed position to an open position with respect to a corresponding one of the openings in the wall of the bore, one said opening becoming increasingly closed with respect to its associated inlet passage as the other becomes increasingly opened. Where each inlet passage discharges into the mixing chamber a valve seat is provided, and a valve is provided for movement into and away from engagement with such seat. Rotation of the plug in the bore thus regulates the relative amounts of fluid flowing from the entrance chamber to the mixing chamber, and movement of the valve from and toward its seat regulates the total volume of fluid flow discharged through the outlet passage.

The mixing control member supports a valve operator handle which is mechanically connected in conventional fashion to a valve stem attached to the valve. Operation of such valve handle opens and closes the valve.

The outlet passage may open into the mixing chamber through a space between the periphery of the valve seat and the wall of the control member, whereby the outlet passage is not itself opened or closed by the valve. Alternatively the outlet passage may communicate with the mixing chamber through a space inside the periphery of the valve seat, whereby the outlet passage is closed or opened by the valve concurrently with the inlet passages.

The openings through the wall of the cylindrical bore, through which fluid flows from the entrance channels, are preferably axially spaced, and a circumferential fluid-tight seal is provided between the wall of the bore and the cylindrical plug at an axial position intermediate the openings. Advantageously, O-ring seals are disposed between the plug and the cylindrical wall of the bore above the upper of the two openings, below the lower of the two openings, and intermediate the two openings.

The foregoing and other features of the invention are described below with reference to the accompanying drawings.

DESCRIPTION OF THE DRAWINGS

FIG. 5 shows a modified embodiment of a plug for a mixing control assembly taken along section line V—V of FIG. 9;

FIG. 6 is a front view of the mixing control plug of FIG. 5;

FIG. 7 is a sectional view of the mixing control plug member of FIG. 6, taken along section line VII—VII of FIG. 8;

FIG. 8 is a cross-section taken along section line VIII—VIII of FIG. 6.

FIG. 9 is a cross-section taken along section line IX—IX of FIG. 6; and

FIG. 10 is a section through the plug taken along section line X—X of FIG. 7.

DESCRIPTION OF THE INVENTION

Figure 1:
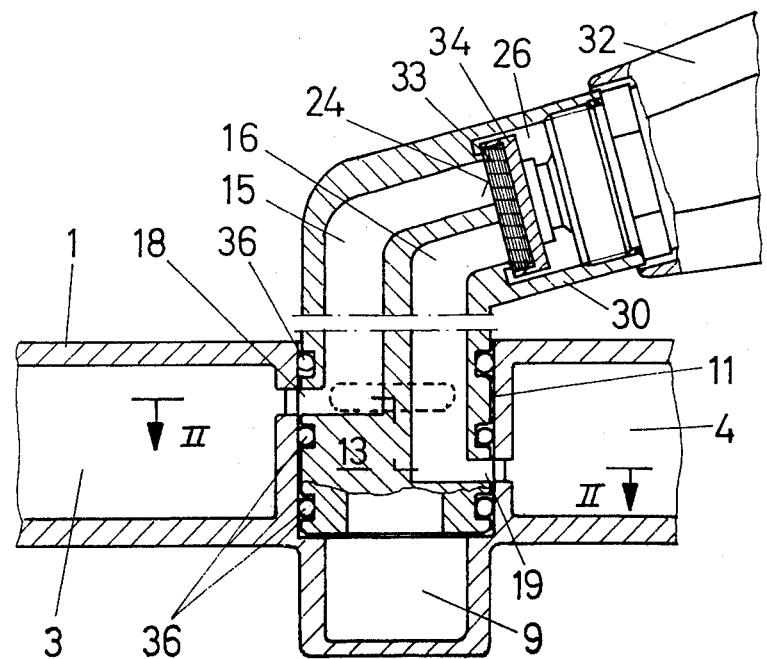
FIG. 1 is a section through a mixing valve assembly according to the invention, with an angular swingable mixing control member, wherein for the purpose of simplified illustration the bent upper part of the assembly is turned 90° from the plane of the drawing compared with the lower plug component.
Figure 2:
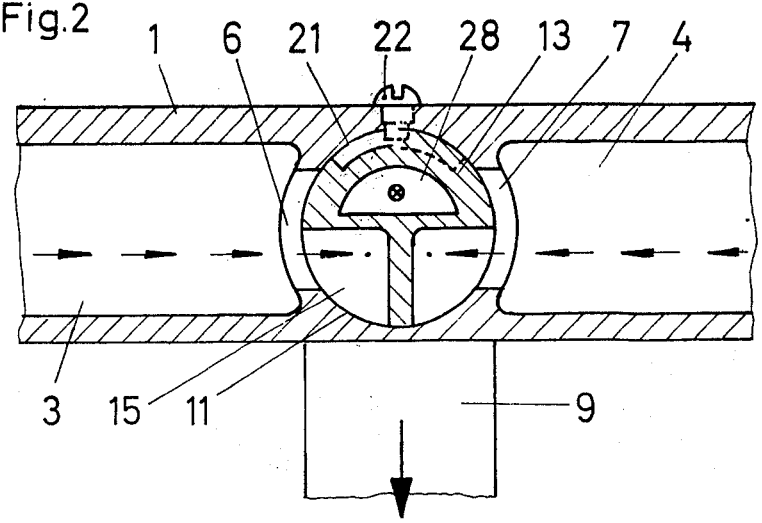
FIG. 2 is a section through the assembly of FIG. 1 taken along section line II—II of FIG. 1.

The mixing valve assembly illustrated in FIGS. 1 and 2 comprises a body portion having a hot water entrance channel 3 and a cold water entrance channel 4. At the end of each of the two channels 3 and 4 is a slot opening 6 and 7. Said openings 6 and 7 are formed in the wall of a cylindrical bore 11, in which a plug 13 is rotatably mounted. As may be seen in FIG. 1, under the plug 13 is a discharge channel 9 of a spout for the discharge of mixed hot and cold water.

The plug 13 forms part of a mixing control member having a hot water inlet passage 15 and a cold water inlet passage 16. At their ends in the plug these side by side passages may communicate through axially and circumferentially spaced slots 18, 19 with the slots 6, 7 opening into the corresponding channels 3 and 4. The hot water and cold water systems are separated from each other by means of a central O-ring seal 36, and the two pairs of communicating slots 6, 7 and 18, 19 are each sealed from the outside and from the discharge channel 9 by top and bottom O-ring seals 36.

The plug 13, as may be seen in FIG. 2, is provided with a peripheral groove 21, into which projects a holding screw 22 screwed into the housing 1, which screw 22 together with the groove 21 limits rotation of the plug 13 and also restrains it from axial displacement from the bore 11.

Above the plug 13 the mixing control member of FIG. 1 is offset. At its upper end it forms a valve housing 30, in which is formed a valve seat 24 and an adjoining mixing chamber 26. The valve seat 24 provides for closing off the inlet passages 15 and 16, as well as an outlet passage 28 which also extends through the mixing control member and opens at its lower end into the spout channel 9. Mounted on the valve housing 30 is a valve handle 32, by rotation of which a valve comprising a valve washer 33 in a retainer 34 may be moved into closed relation with, or opened from, the valve seat at the upper ends of the passages 15, 16 and 28 where they open into the mixing chamber 26. The hot and cold water flowing out of the two channels 15, 16 become mixed, when the valve 33, 34 is opened, according to the pressure ratios in the entrance channels 3 and 4 and the degree to which there is open communication between slots 18 and 19 and the entrance channels. The mixed water then discharges through the outlet passage 28 into the spout channel 9, which forms a part of the body member 1.

Depending on the angular position of the plug 13, the hot water supply may be completely shut off or completely opened. The cold water supply is correspondingly completely opened or completely shut off. It is therefore possible, when the valve 33, 34 is opened, to adjust the temperature of the mixed wter flow by adjusting the angular position of the plug. By turning the control handle 32 it is possible to regulate the total volume of water flow. The turbulent flow of the hot and cold water in the small mixing chamber 26, and its flow from the mixing chamber through the outlet passage 28, insures a true intermixture of the two components, so that the water discharged from the spout is at uniform temperature both across the sectional area and with time as it flows.

By loosening the holding screw 22, the plug 13 may be removed from the housing 1, as may be necessary, for example, for cleaning or for replacing the O-ring seals.

Figure 3:
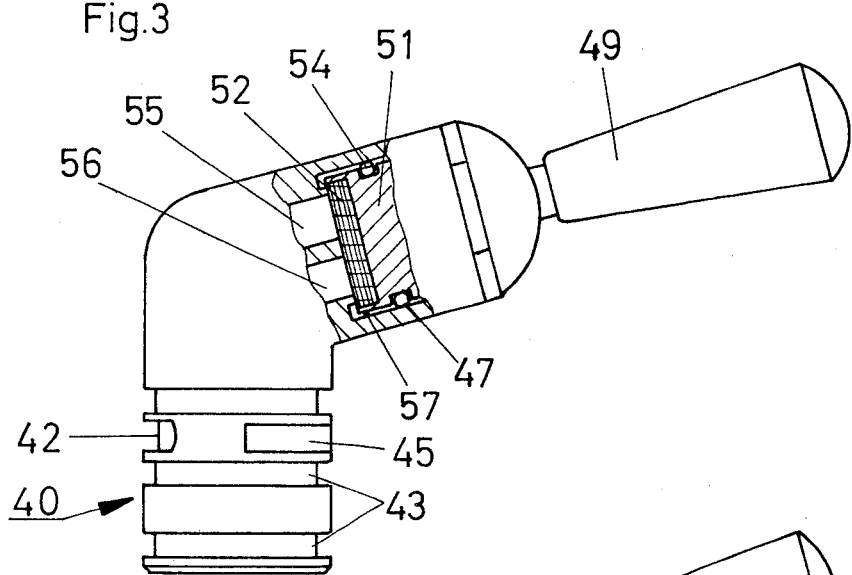
FIG. 3 shows an angular mixing control member having a lever-operated volume-control valve.

FIG. 3 shows a slightly different embodiment of the mixing control member having a plug 40 at its lower end and an angularly displaced upper part. This plug 40 is formed with a peripheral groove 42 to receive a locking screw, and grooves 43 for O-ring seals. It likewise has two inlet slots, of which only one, 45, for the hot water, is visible. The upper part of the member forms a valve housing 47, in which a valve 52 is moved from or toward a seat by means of a control lever 49. Such movement may be by way of a conventional cam, not shown, which is engaged by the control lever and which actuates a valve stem 51 to position the valve 52 substantially as desired relative to the valve seat at the upper ends of the inlet passages 55 and 56 and outlet passage (not shown). An O-ring 54 seals the valve from the outside. The mixing chamber is shown at 57. In other respects, the construction is the same as the embodiment shown in FIGS. 1 and 2.

Figure 4:
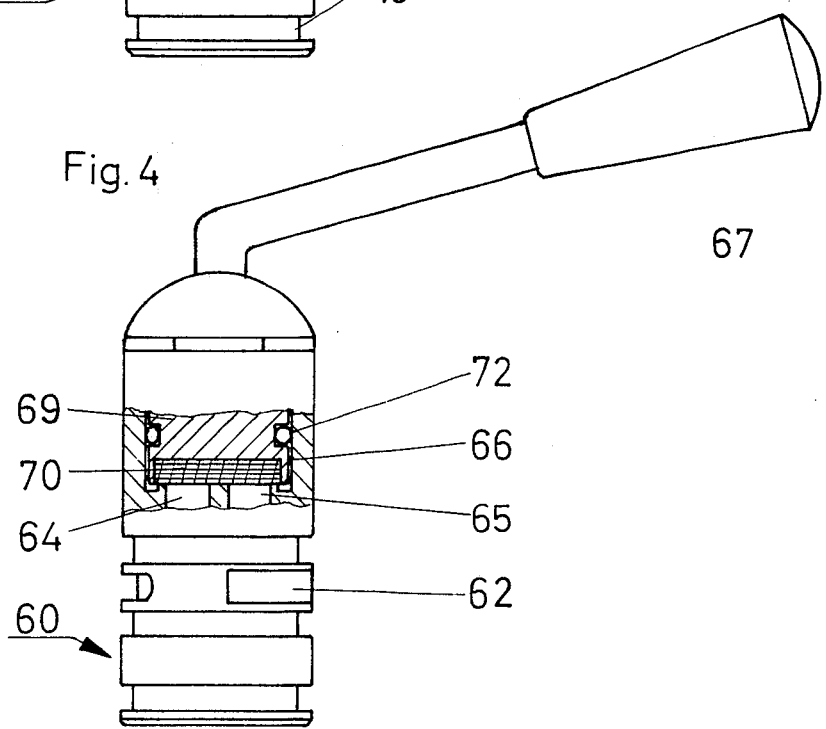
FIG. 4 shows a variant of the embodiment according to FIG. 3, having a straight cylindrical mixing control assembly.

FIG. 4 shows an upright cylindrical form of a mixing control member having a plug 60, a hot water inlet slot 62, a hot water inlet passage 65, a cold water inlet passage 64 and a mixing chamber 66. The cold water inlet slot is not visible. In this embodiment a control lever 67, which for example may operate a cam plate, is provided to move a valve stem 69 engaging a valve 70 for regulating volume of flow of hot and cold water through the inlet passages 64, 65 and the outlet passage (not shown). The valve body is sealed off from the outside by means of an O-ring 72.

It is evident that instead of cold and hot water, other unlike fluids may be mixed, for example ice water and cold water, or fluids such as oil and gasoline, so that this mixing fitting for example may also be used in the chemical industry, in particular in laboratory work. It is then possible, by means of a corresponding suitable dial on the body portion 1 and a corresponding pointer on the plug 13, to set desired volume ratios of the flows to be mixed. In the case of mixing hot and cold water a temperature dial may be arranged on the body portion for adjusting and setting the ratio of hot and cold water.

The mixing control member 75 shown in FIGS. 5 to 10 comprises a plug portion at its lower end, with a hot water inlet passage 77 and a cold water inlet passage 78 leading upwardly from the plug to a mixing chamber 80. The mixed hot and cold water is carried out of the latter through an outlet passage 79. In this embodiment a valve seat 82 is provided where the inlet passages 77 and 78 open into the mixing chamber. A valve, not shown, constructed similarly to the valves described in FIGS. 1 – 4, may be mounted in the mixing chamber for movement toward and from the valve seat to regulate the volume of water flowing into the mixing chamber and out through the outlet passage 79. However, in this embodiment the outlet passage communicates with the mixing chamber through a space outside the periphery of the valve seat, and is not closed by operation of the valve. This construction is advantageous for some uses. In other respects, it is the same in design as the other embodiments described above.

I claim:
1. A mixing valve assembly comprising
A. a body portion having
   1. a cylindrical bore extending therethrough,
   2. a pair of entrance channels for the admission of two dissimilar fluids,
   3. a discharge spout,
      a. said channels communicating with said bore through separate openings in the wall of said bore,
      b. said openings being axially spaced,
B. a mixing control member including
   1. a cylindrical plug mounted and rotatable in said bore,
      a. and a fluid tight circumferential seal disposed between said plug and the wall of the bore intermediate the axially spaced openings therein,
   2. said control member having therein
      a. a mixing chamber,
      b. two separate inlet passages discharging into the mixing chamber, and
      c. an outlet passage extending entirely through said mixing control member and discharging from the mixing chamber to said discharge spout in side-by-side relation with said inlet passages from the mixing chamber.
         i. each inlet passage being movable with rotation of the plug in the bore from a closed position to an open position with respect to a corresponding one of the openings in the wall of the bore, one of said openings becoming increasingly closed as the other becomes increasingly opened,
      d. a valve seat at the discharge of the inlet passages into the mixing chamber, and
      e. a valve engageable with said seat, whereby rotation of the plug in the bore regulates the relative amounts of fluids flowing from the entrance channels to the mixing chamber, and movement of the valve from and toward its seat regulates the total volume of flow discharged through the outlet passage.

2. A mixing valve assembly according to claim 1, wherein the two inlet passages of the mixing control member discharge into the mixing chamber together through a substantially circular valve seat.

3. A mixing valve assembly according to claim 2, wherein a valve actuating stem secured to the valve extends through the mixing chamber, and a valve operator handle is mounted on the mixing control member and is attached to said valve stem for moving the valve into and away from closed engagement with the valve seat.

4. A mixing valve assembly according to claim 1 wherein the outlet passage communicates with the mixing chamber through a space between the upper periphery of the valve seat and a wall of the control member bounding the mixing chamber, and said outlet passage is not closed by engagement of the valve with the valve seat.

5. A mixing valve according to claim 1, wherein the outlet passage communicates with the mixing chamber through a space within the periphery of the valve seat, and said outlet passage is closed concurrently with the inlet passages by engagement of the valve with the valve seat.

6. A mixing valve assembly according to claim 1, wherein O-ring seals are disposed between the cylindrical bore and the plug above the upper of the two openings, and below the lower of the two openings.

7. A mixing valve according to claim 1, wherein the plug is held in the bore by a locking screw extending through a wall of the bore into an arcuate slot in the plug, whereby axial movement of the plug is restrained while permitting limited rotational movement thereof in the bore.

8. A mixing valve according to claim 1, wherein the openings through the wall of the cylindrical bore are in the form of circumferentially extending slots spaced with respect to the inlet passages of the mixing control member plug so that rotation of the latter may move it from a position where the first such opening is in full communication with a first inlet passage while the second such opening is closed off from communication with the second inlet to a position where the second such opening is in full communication with the second such inlet passage while the first such opening is closed off from communication with the first inlet passage through positions where each opening is at least partially in communication with the associated inlet passage.

* * * * *

UNITED STATES PATENT AND TRADEMARK OFFICE
CERTIFICATE OF CORRECTION

PATENT NO. : 3,967,649
DATED : July 6, 1976
INVENTOR(S) : Robert Amblank

It is certified that error appears in the above-identified patent and that said Letters Patent are hereby corrected as shown below:

Column 3, line 26, "wter" should read --water--

Column 5, line 20, "upper" should read --outer--

Signed and Sealed this

Seventh Day of September 1976

[SEAL]

Attest:

RUTH C. MASON
*Attesting Officer*

C. MARSHALL DANN
*Commissioner of Patents and Trademarks*